(12) United States Patent
Sela

(10) Patent No.: US 9,037,191 B2
(45) Date of Patent: May 19, 2015

(54) CELLULAR COMMUNICATION SYSTEM FOR REDUCING THE EFFECTS OF RADIATION EMITTED FROM CELLULAR PHONE ANTENNAS

(76) Inventor: Nisim Sela, Herzliya (IL)

( * ) Notice: Subject to any disclaimer, the term of this patent is extended or adjusted under 35 U.S.C. 154(b) by 1309 days.

(21) Appl. No.: 12/064,281

(22) PCT Filed: Aug. 21, 2006

(86) PCT No.: PCT/IL2006/000971
§ 371 (c)(1),
(2), (4) Date: Jul. 25, 2008

(87) PCT Pub. No.: WO2007/023490
PCT Pub. Date: Mar. 1, 2007

(65) Prior Publication Data
US 2008/0287161 A1 Nov. 20, 2008

(30) Foreign Application Priority Data
Aug. 22, 2005 (IL) .......................................... 170435

(51) Int. Cl.
*H04B 1/38* (2006.01)
*H04M 1/725* (2006.01)
(Continued)

(52) U.S. Cl.
CPC ........... *H04B 1/3838* (2013.01); *H04M 1/6066* (2013.01); *H04W 76/02* (2013.01); *H04M 1/7253* (2013.01); *H04W 84/12* (2013.01); *H04M 2250/02* (2013.01); *H04W 88/02* (2013.01)

(58) Field of Classification Search
CPC .................... G06K 19/0723; G06K 19/07749; H04M 1/7253; H04M 2250/14; H04M 2250/04; H04M 1/0254; H04M 2250/02; H04M 1/6066; H04M 1/72519; H04M 1/6041; H04B 5/0031; H04B 5/0075; H04B 1/406; H04B 5/02; H04B 5/00; H04W 4/008; H04W 88/06; H04W 88/02; H04W 76/02; H04W 84/12
USPC .............. 455/11.1, 15, 41.2, 41.3, 90.2, 90.3, 455/127.4, 128, 129, 418, 420, 550.1, 455/552.1, 553.1, 556.1, 558, 566, 569.1, 455/575.1, 575.5, 575.6, 57, 5.7, 575.8, 455/41.1, 557; 340/568.1; 370/338
See application file for complete search history.

(56) References Cited

U.S. PATENT DOCUMENTS 5,956,651 A * 9/1999 Willkie et al. ............. 455/553.1
5,956,653 A * 9/1999 Lahti ............................ 455/558
(Continued)

FOREIGN PATENT DOCUMENTS

GB 2 377 788 1/2003
GB 2377788 1/2003
(Continued)

OTHER PUBLICATIONS

Israel Office Action for corresponding Israel Patent Application No. 170435 mailed Jun. 27, 2013.
(Continued)

*Primary Examiner* — Olumide T Ajibade Akonai
(74) *Attorney, Agent, or Firm* — Merchant & Gould P.C.

(57) ABSTRACT

A cellular communication system includes a cellphone interface unit that includes a transceiver for low power RF communication; a microphone; an earphone; a display; a keypad; a hub device that includes a transceiver for low power RF communication; an antenna for high power RF communication and circuitry and appropriate software components for establishing a communication channel between the hub and a base station.

17 Claims, 3 Drawing Sheets

(51) Int. Cl.
*H04W 88/02* (2009.01)
*H04M 1/60* (2006.01)
*H04W 76/02* (2009.01)
*H04W 84/12* (2009.01)

(56) References Cited

U.S. PATENT DOCUMENTS

| | | | |
|---|---|---|---|
| 6,131,040 A * | 10/2000 | Knuutila et al. | 455/550.1 |
| 6,134,437 A * | 10/2000 | Karabinis et al. | 455/427 |
| 6,240,301 B1 * | 5/2001 | Phillips | 455/558 |
| 7,031,657 B2 * | 4/2006 | Tehrani | 455/11.1 |
| 7,257,372 B2 * | 8/2007 | Kaltenbach et al. | 455/41.2 |
| 7,483,679 B2 * | 1/2009 | Kurobe et al. | 455/90.3 |
| 7,565,187 B1 * | 7/2009 | Dynok et al. | 455/575.6 |
| 7,715,830 B2 * | 5/2010 | Cocita | 455/418 |
| 7,738,411 B2 * | 6/2010 | Koponen et al. | 370/315 |
| 2001/0033228 A1 * | 10/2001 | Kisreman et al. | 340/568.1 |
| 2002/0085511 A1 | 7/2002 | Koponen et al. | |
| 2003/0043037 A1 * | 3/2003 | Lay | 340/568.1 |
| 2003/0083058 A1 | 5/2003 | Mayer | |
| 2003/0232597 A1 | 12/2003 | Mayer | |
| 2004/0192228 A1 | 9/2004 | Yamamoto et al. | |
| 2006/0022822 A1 * | 2/2006 | Wong et al. | 340/568.1 |
| 2007/0291703 A1 * | 12/2007 | Muller | 370/338 |

FOREIGN PATENT DOCUMENTS

| | | |
|---|---|---|
| JP | 11-205443 A | 7/1999 |
| JP | 2002-247233 A | 8/2002 |
| JP | 2004-5335627 | 11/2004 |
| WO | WO 02/091704 | 11/2002 |

OTHER PUBLICATIONS

Japanese Notification of Reasons for Refusal for corresponding Japanese Patent Application No. 2008-527591 mailed Apr. 9, 2012.

* cited by examiner

CELLULAR COMMUNICATION SYSTEM FOR REDUCING THE EFFECTS OF RADIATION EMITTED FROM CELLULAR PHONE ANTENNAS

FIELD OF THE INVENTION

The present invention relates in general to cellular phones. In particular, the present invention relates to a cellular communication system for reducing the effects of radiation emitted from cellular phone antennas.

BACKGROUND OF THE INVENTION

Over the past decade or so, people have become more and more accustomed to using and relying on cellular phones as a way of keeping in communication with others. As technology has advanced, cellular phones have become more than mere portable telephones. Today, cellular phones are used for a wide range of functions, including as an organizer, a video camera and a Web browser. Cellular phones generally may also store the contact information, including phone numbers, addresses, etc. of all of a person's friends, relatives and business associates. It is obvious, therefore, that such a device is of extreme importance to its owner. Loss or theft of one's cellular phone may mean the loss of irreplaceable information.

Constant use of cellular phones means frequently removing and replacing the device to and from its storage location, e.g. one's pocket, one's belt or one's purse or bag. Sometimes, for instance, when expecting to receive or to make phone calls, a user may carry the cellular phone in his hand for long periods of time, instead of having to remove and replace the device to and from its storage location. This continual handling of the cellular phone can result in temporarily setting the cellular phone down, e.g. on the table in a restaurant, at a cash register in the supermarket, etc., and not remembering to take it when leaving the location. This is due to the user thinking, consciously or subconsciously, that the cellular phone was in its storage location, when, in fact, it was not.

A dishonest person who finds, or a thief who steals, a cellular phone that does not belong to him, may use the phone to make calls, which would be charged to the cellular phone's owner. He may even utilize the information stored in the phone, for unlawful or damaging purposes. Thus, the owner not only has to deal with replacing all of the lost information stored in his phone, he must additionally deal with any costs incurred by the criminal who obtained and made use of the phone.

Many studies have shown that constant exposure to the electromagnetic radio frequency (RF) emissions from cellular phone antennas has been linked to cancer, brain tumors, Alzheimer's disease, and other undesirable ailments. Thus, although people may enjoy communicating using their cellular phones, it is preferable to keep the cellular phone antennas as far away from them as possible. To this end, a wide range of solutions have already been provided. One, very prevalent solution, is to provide an external earpiece and microphone that are connected via a wire to the cellular phone. This device comes in various forms, ranging from an entire headset comprising earphones and a microphone for the user to wear over his head, to a tiny earpiece that the user may lodge in his ear, having a microphone that is either connected to the earpiece, or situated along the wire. During the conversation, the user may, therefore, hold the cellular phone at a distance from his body, or, at least from his head, in order to minimize exposure to the dangerous radiation.

However, these solutions have drawbacks associated with them. The headset is a bulky accessory that is not convenient to carry around, and is awkward and uncomfortable to wear. Although an earpiece is more compact, many people find that it is uncomfortable to have an earpiece lodged in their ear. Additionally, earpieces often provide poor sound quality for the user.

An additional disadvantage associated with both of the above-mentioned solutions is that both the headset and the earpiece require a wired connection to the cellular phone. The wire often gets tangled when in storage in one's pocket or bag, as well as during use. Moreover, if one mistakenly pulls the cellular phone too far away from the headset or earpiece, the wire may detach, or the earpiece may be pulled out of the user's ear, thereby loosing losing the connection in the middle of a phone call until the wire or earpiece is properly replaced.

In order to solve the problems related to the wired connection, a relatively recently developed technology called Bluetooth may be utilized. Bluetooth is a wireless radio standard primarily designed for low power consumption, with a short range transceiver microchip in each communicating device. A Bluetooth chip is installed in the cellular phone and in the wireless earpiece. The user wears the earpiece (with microphone), which communicates with the cellular phone that may be situated at a distance from the user, and the cellular phone communicates with the nearest base station. Using Bluetooth, one still requires additional earpiece and microphone accessories, but not any connecting wires.

Nevertheless, some cell phone users prefer to hold the phone directly to their ear, without using unpleasant earphones.

US 2003/0232597 discloses a bluetooth cellular phone wherein the antenna is removed and replaced by a short range low energy wireless communication device, such as a Bluetooth chip. Instead of communicating with the cellular company's nearest base station, the cellular phone of US 2003/0232597 communicates with a proxy device, which is a transducer that transfers information to and from the cellular phone through another Bluetooth chip. The proxy devices also communicates, through a normal cellular antenna, with the cellular company's nearest cell or cells.

The above-mentioned solutions provide means for a cellular phone user to reduce his exposure to RF radiation by dividing the cellular phone into two devices, one with the antenna, and another with all of the remaining standard cellular phone features. Nevertheless, no solution has been provided for a user who prefers to hold his cellular phone during a phone call over using an earpiece, and who wants to avoid inconveniences involved with loss or theft of the device, as described above.

It is therefore an object of the present invention to provide a cellular communication system for reducing the inconveniences involved with loss or theft of a cellular phone.

It is an additional object of the present invention to provide a cellular communication system for reducing exposure to radiation emitted from a cellular phone antenna.

Additional objects and advantages of the present invention shall become apparent as the description proceeds.

SUMMARY OF THE INVENTION

The present invention relates to a cellular communication system for a user, comprising:
  a. A short-range phone interface unit comprising the following hardware:
    i. a transceiver for providing short-range wireless communication with a cellular hub device;

ii. a microphone;
iii. an earphone;
iv. a display;
v. a keypad;
vi. first circuitry and appropriate software for controlling the operation of said hardware and for establishing a short-range wireless communication channel to said hub device;
b. a cellular hub device comprising:
   i. a transceiver for establish short-range wireless communication with said phone interface unit;
   ii. an antenna for transmitting and receiving high power RF communication signals to and from a cellular base station;
   iii. second circuitry and appropriate software for allowing communication between said user and said base station by establishing a high power RF communication channel between said cellular hub and said base station and short-range wireless communication channel to said phone interface unit;
   iv. a user identification module; and
   v. a memory for storing valuable information for said user.

The transceiver may be a Bluetooth chip.

Preferably, the short-range phone interface unit is in the form of a cellular phone.

Preferably, the second circuitry and software components comprise:
a. a Flash memory chip;
b. an ROM chip;
c. an RF and power section;
d. RF amplifiers;
e. a SIM card.

The short range wireless communication takes place between the short-range phone interface unit and the cellular hub device The high power RF communication of the system takes place between the hub device and a cellular base station.

Optionally, recharging of the short-range phone interface unit and the cellular hub device may be chosen from any one of the group consisting of
a. individually; and,
b. as a unit.

Optionally, the short-range phone interface unit further comprises a secondary identification card for providing a unique identification code for authenticating communication with the cellular hub device.

Additionally, both the short range phone interface unit and the cellular hub device may comprise an additional port chosen from any one of the group consisting of:
a. USB;
b. fire wire;
c. audio in/out;
d. video in/out;
e. headphone;
f. microphone; and,
g. any combination thereof.

The present invention is defined by the claims, the contents of which are to be read as included within the disclosure of the specification, and will now be described by way of example with reference to the accompanying figures.

DETAILED DESCRIPTION OF THE PREFERRED EMBODIMENTS

Cellular phones typically contain information that is valuable to the owner, including contact information, memos, or even entire computer files. Loss or theft of the cellular phone, therefore, often means loss of all of the information stored therein. The present invention relates to a cellular communication system comprising a cellular phone interface that communicates with a hub device, which, in turn, communicates with a cellular base station. The hub device contains the cellular antenna, as well as circuitry and appropriate software components for establishing a communication channel between the hub and a base station, which, in conventional cellular phones, is found in the phone itself, and may be attached to a keychain, or stored in one's bag. Thus, if the cellular phone is lost or stolen, no valuable information is lost.

The term, "base station" as used herein refers to typically a tower but can be any station comprising at least one antenna mounted thereon, which emits RF electromagnetic radiation, and communicates with a cellular phone.

Figure 1:
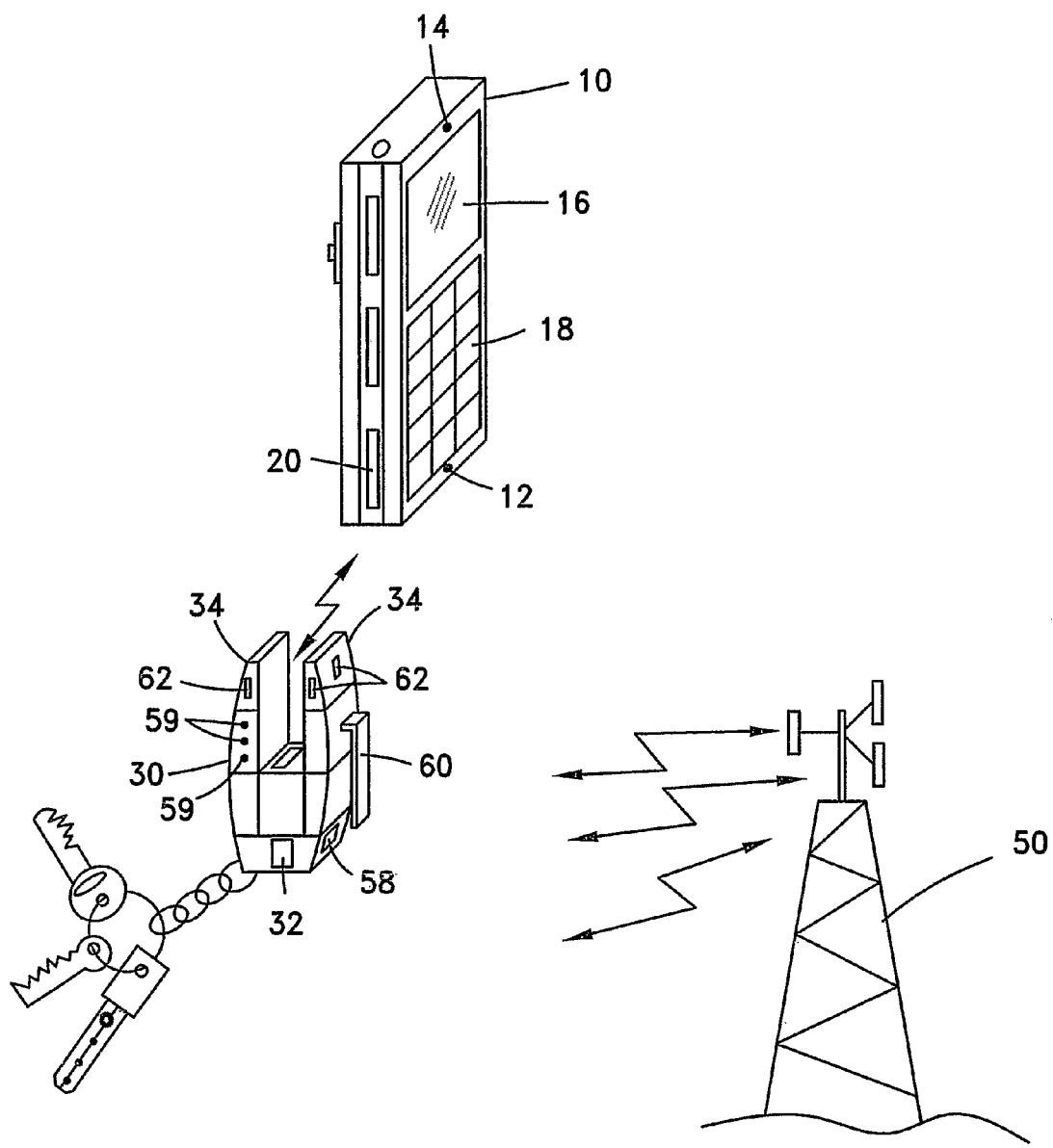
FIG. 1 illustrates a preferred embodiment of the present invention, schematically showing the cell phone and wireless hub device of the present invention, in communication with each other as well as the hub device in communication with a cellular base station.

A preferred embodiment of the present invention, shown schematically in FIG. 1, comprises an interface, which, in this embodiment takes the form of a cellular phone (10), having a microphone (12), earphone (14), display (16), keypad (18) and a short range low energy wireless communication device, such as a Bluetooth transceiver (22). Wireless hub device (30) comprises the cellular phone's (10) antenna (34), circuitry and appropriate software components (not shown) for establishing a communication channel between hub (30) and a base station (50) and a Bluetooth transceiver (32). Hub (30) may be attached to a keychain (36) or necklace (not shown) for convenience.

The hub device (30) circuitry and software components typically include the ROM and Flash memory chips, which provide storage for the hub device's operating system, and customizable features, such as the phone directory; the RF and power section, which handle power management and recharging; the RF amplifiers, which handle signals traveling to and from the antenna. Hub device (30) stores the System Identification Number (SID) and Mobile Identification Number (MIN) codes either in the internal memory, or on any identification chip or smartcard, such as a Subscriber Identification Module (SIM) card.

Cell phone (10) communicates with hub device (30) via Bluetooth low power RF transceiver (20), and hub device (30) transfers information to and from cell phone (10) via Bluetooth lower power RF transceiver (32), and to and from a cellular base station (50) via high power RF antenna (34). It should be noted that other methods of wireless communication, e.g. infrared, WiMax, and Wi-Fi can be employed with the present invention.

If cell phone (10) is lost or stolen, the owner does not lose any valuable information, as all valuable information is stored in hub device (30). Since hub device (30) is not required to be regularly removed and replaced to and from its storage location, as described above, the chances of loosing losing hub device (30) are much lower than that of loosing losing the cell phone (10) itself.

Additionally, and importantly, since the cell phone antenna is separated from the cell phone itself, the radiation that the user is exposed to is greatly reduced.

According to one embodiment of the present invention, hub device (30) is water proof.

According to another embodiment of the present invention, hub device (30) is enclosed by RF shielding material for allowing only directional electromagnetic radiation to exit the hub (30), and preventing multidirectional radiation.

Different embodiments of the invention can be provided having one or more of the following features available on either the phone, the hub device, or both:

Expandable memory that allows for synchronization of the information entered on either the phone or hub to be stored in the memory of both devices, so that the loss of one of them does not mean the loss of valuable information such as lists of contacts, diary, etc.;

Vibration option;

Software, e.g. APPS, games, MP3, caller ID, ringtones, wed browser, MMS/MME;

Camera; and

FM radio.

Figure 2:
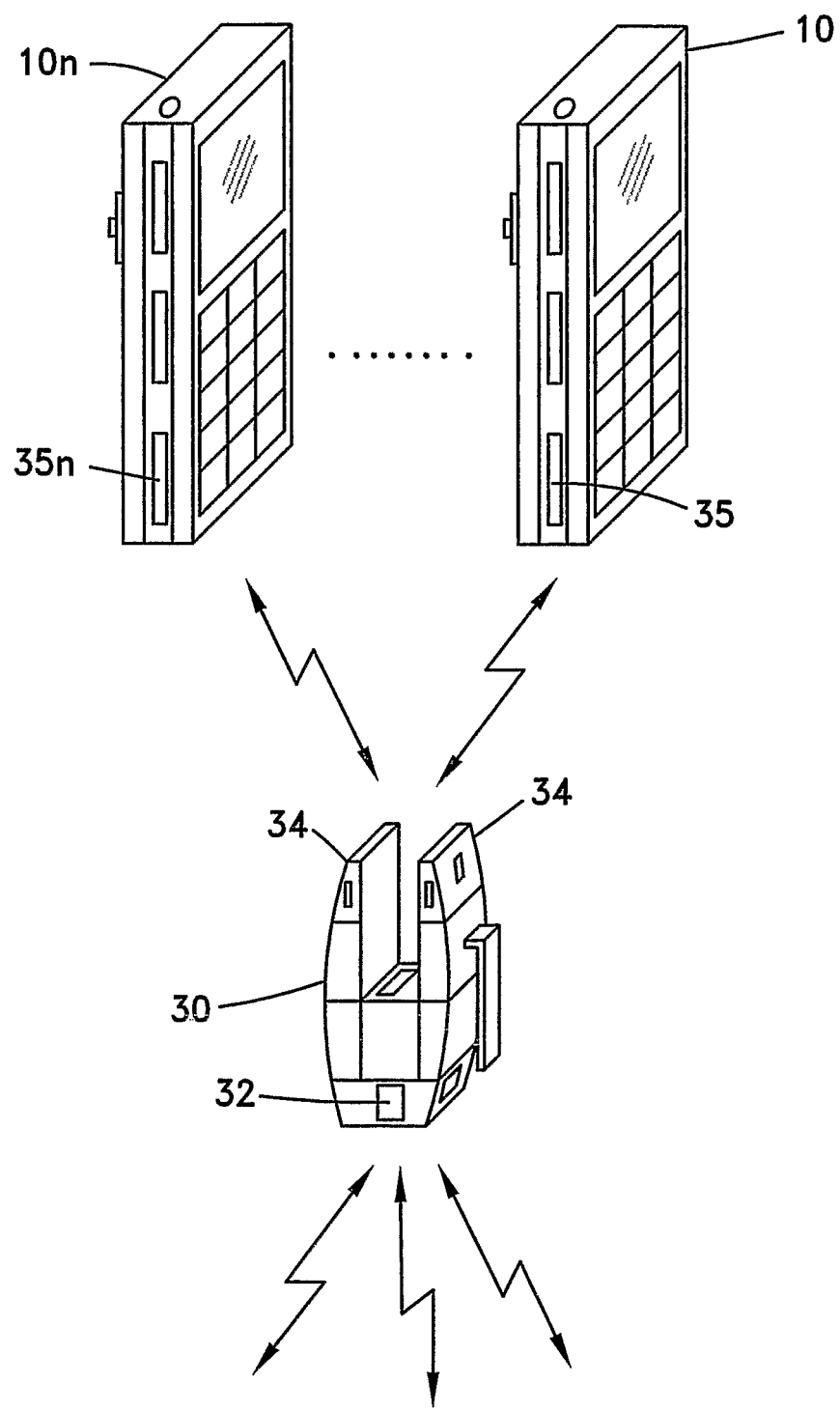
FIG. 2 illustrates an additional embodiment of the present invention, wherein a secondary identification card is provided in the cell phone for transmitting a unique identification code to the hub device.

Optionally, cellular phone (10) further comprises a secondary identification card (35), as shown in FIG. 2, such as a SIM card or identification chip for providing a unique identification code or personal identification number (PIN) that is required for authenticating communication with hub (30). The code may be automatically transmitted to hub (30), or the user may be prompted to input his PIN before dialing. Additional cellular phones (10n) may be provided with a unique identification card (35n) for enabling communication with a single hub (30). This feature allows multiple users to share information, such as video or audio data, games, etc., via hub (30). Additionally or alternatively, a secure communication channel may be provided, for instance, by sending encrypted signals.

Figure 3:
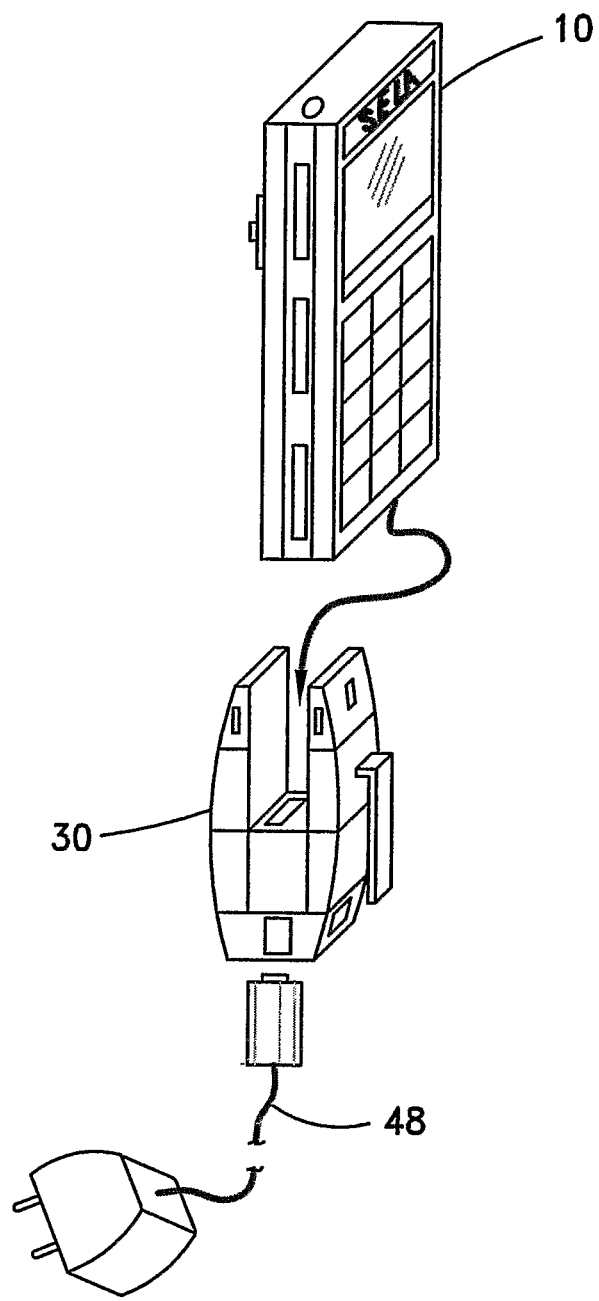
FIG. 3 illustrates the cell phone and hub device capable of being recharged while joined to each other.

Cell phone (10) and hub device (30) may be each rechargeable individually, as a stand-alone device, and/or they may be recharged as a unit, for example, as shown in FIG. 3, wherein charging plug (48) is removably connected to hub device (30), which, in turn, is connected to cell phone (10). Additionally, hub device (30) may be utilized to charge cell phone (10) or vice versa via an internal or external charging source. Hub device (30) may remain attached to cell phone (10) during non-use, and detached therefrom when using cell phone (10).

At least one additional memory card may be removably inserted to hub (30) for increasing the storage and/or memory capabilities of the system.

With reference to FIG. 1, cell phone (10) and/or hub device (30) may additionally comprise additional ports (58), (59), including USB, fire wire, audio in/out, video in/out, headphone, microphone, etc. for inserting external hardware components thereto, as well as appropriate control buttons (62) for performing desired operations.

If cell phone (10) is misplaced amongst one's belongings, by pressing a button on hub device (30), a signal is transmitted to cell phone (10), which, in turn, causes a beeping or ringing noise to be sounded from cell phone (10). A similar operation may be performed on cell phone (10) if hub device (30) is misplaced.

According to another embodiment of the present invention, each of the cellular phone (10) and hub device (30) is capable of communicating with other Bluetooth containing devices, such as a television or computer.

Optionally, hub device (30) additionally comprises a coupling mechanism such as a clip (60) for removably attaching to a belt, shirt or purse, or to any other convenient accessory.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A cellular communication system for a user, comprising two or more short-range phone interface units, and a cellular hub device;
   a. each of said two or more short-range phone interface units comprising the following hardware:
      i. a transceiver for providing short-range wireless communication with said cellular hub device;
      ii. a microphone;
      iii. an earphone;
      iv. a display;
      a keypad; and
      vi. first circuitry and software for controlling the operation of said hardware and for establishing a corresponding short-range wireless communication channel to said cellular hub device;
   b. said cellular hub device comprising:
      i. a transceiver for establishing short-range wireless communication with said two or more short-range phone interface units;
      ii. an antenna for transmitting and receiving high power radio frequency (RF) communication signals to and from a cellular base station;
      iii. second circuitry and software for allowing communication between said two or more short-range phone interface units by said corresponding short-range wireless communication channels;
      iv. a user identification module; and
      v. a memory for storing valuable information for said user;
      wherein all memory devices of said two or more short-range phone interface units are firmware memory devices, the firmware memory devices being interfaceable only with said first circuitry and software;
      wherein a call is communicable by said second circuitry and software, from a first phone interface unit of said short-range phone interface units to a second phone interface unit of said short-range phone interface units without intervention of the base station, via a first short-range wireless communication channel between said first phone interface unit and said hub unit and a second short-range wireless communication channel between said hub unit and said second phone interface unit.

2. A system according to claim 1, wherein the transceiver of each of the two or more short-range phone interface units is a Bluetooth chip.

3. A system according to claim 1, wherein the short-range phone interface unit comprises a cellular phone.

4. A system according to claim 1, wherein the second circuitry and software components comprise:
   b. a ROM chip;
   c. an RE and power section;
   d. RF amplifiers;
   e. a SIM card.

5. A system according to claim 1, wherein short-range wireless communication takes place between the short-range phone interface unit and the cellular hub device.

6. A system according to claim 1, wherein the second circuitry and software is operable for establishing a high power RE communication channel between the cellular hub device and the cellular base station for communication between one of the two or more short-range phone interface units and the cellular base station.

7. A system according to claim 1, wherein recharging of the short-range phone interface unit and the cellular hub device is selected from any one of the group consisting of:
   a. individually; and
   b. as a unit.

8. A system according to claim 1, wherein each of the two or more short-range phone interface unit further comprises a secondary identification card for providing a unique identification code for authenticating communication with the cellular hub device.

9. A system according to claim 1, wherein both the short-range phone interface unit and the cellular hub device comprises an additional port chosen from any one of the group consisting of:
   a. USB;
   b. fire wire;
   c. audio in/out;
   d. video in/out;
   e. headphone;
   f. microphone; and,
   g. any combination thereof.

10. A system according to claim 1, wherein
   the antenna of the cellular hub device is operable to transmit and receive high power RF communication signals modulated with desired content to and from the cellular base station.

11. A system according to claim 8, wherein the secondary identification card is also used for providing a unique identification code for authenticating communication of the two or more short-range phone interface units with the cellular base station via the cellular hub device.

12. A system according to claim 11, wherein the secondary identification card is a subscriber identity module (SIM) card.

13. A system according to claim 11, wherein the two or more short-range phone interface units share information exchanged with the cellular base station via a single cellular hub device.

14. A system according to claim 13, wherein the information exchanged with the cellular base station is video or audio data.

15. A system according to claim 10, wherein the second circuitry and software is also operable for establishing a high power RF communication channel between the cellular hub device and the cellular base station, for communication of signals not modulated with the content between the two or more short-range phone interface units and the cellular base station.

16. A system according to claim 1, wherein each of the two or more short-range phone interface units is removably connected to the cellular hub device, the cellular hub device comprising additional ports for performing desired operations as a single integral unit.

17. A system according to claim 16, wherein the desired operations include:
   a. authentication;
   b. synchronization of stored information.

* * * * *